A. L. COLE.
PACKING.
APPLICATION FILED AUG. 3, 1909.

1,078,333. Patented Nov. 11, 1913.

WITNESSES
A. T. Palmer
Charles F. Richardson

INVENTOR
Albert L. Cole
By Francis J. V. Dakin
his atty

UNITED STATES PATENT OFFICE.

ALBERT L. COLE, OF AUBURNDALE, MASSACHUSETTS, ASSIGNOR TO FRANK C. PARMENTER, OF GLOUCESTER, MASSACHUSETTS.

PACKING.

1,078,333.  Specification of Letters Patent.  Patented Nov. 11, 1913.

Application filed August 3, 1909. Serial No. 511,030.

*To all whom it may concern:*

Be it known that I, ALBERT L. COLE, a citizen of the United States, residing at Auburndale, in the county of Middlesex and State of Massachusetts, have invented a new and useful Improvement in Packing, of which the following is a specification, reference being made therein to the accompanying drawings.

The invention relates to packing for piston rods, valves, pumps and for such other purposes for which packing is suitable, and relates particularly to packing composed partly of metal and partly of fibrous material. Heretofore, in the manufacture of such packing it has been found difficult to preserve the packing intact and prevent it from becoming unraveled or partially separated when cut unless an outside cover or covering was provided. Furthermore, even in cases where the packing of that character has been provided with outer covering it frequently happens that in bending the packing rings in order to install the same in a stuffing box around a piston rod, the covering does not entirely prevent unraveling and separation of the strands of the packing, especially at the ends of the packing ring where it is cut.

The main object of this invention is to secure a packing made up of fibrous material and metal which will not come apart and unravel when subjected to hard usage or in the process of installation.

Another object is to obviate the necessity of providing an outer covering for the packing.

A further object is to produce a packing of efficiency and durability, of great elasticity and capable of being compressed to take up the wear on the packing.

The following is a description of the invention, reference being made to the accompanying drawings, in which—

Figure 1:
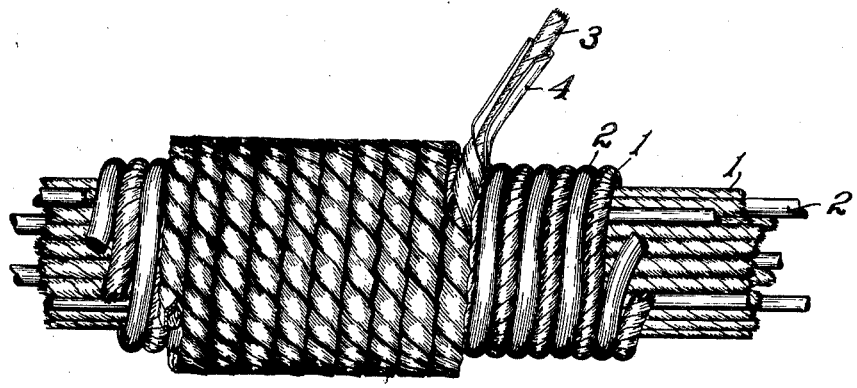
Figure 2:
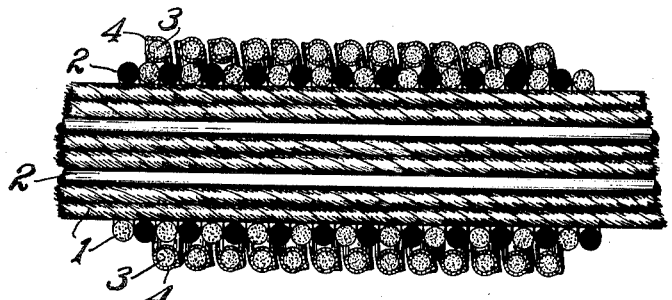
Figure 3:
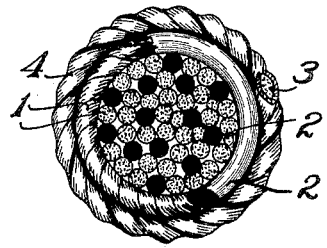

Figure 1 is a side elevation of a section of the packing; Fig. 2 is a central longitudinal sectional view of the same; and Fig. 3 is a cross-section of the same.

The packing is designed to be made in a continuous form similar to rope and briefly is made up of a central body or core composed of a plurality of strands and an outer body made up of two or more layers of strands of suitable material, wound transversely around the core; the strands in the core and the outer body being all bound or cemented together by any suitable rubber composition.

In the drawings illustrating the preferred embodiment of the invention is shown a section of packing comprising a core, made up of a plurality of fibrous strands 1 and strands of rubber composition 2; and an outer body comprising an inner layer formed of alternate strands of fibrous material 1, and strands of rubber composition 2, wound transversely around the core and an outer layer of fibrous strands 3, wound in the same manner, each of said strands 3 being entirely covered with soft anti-friction metal 4.

The method of making the packing is as follows: A core is first formed by taking a plurality of strands or strings 1, made from fibrous material such as flax, hemps, asbestos and the like together with strands of any suitable uncured rubber composition 2, and laying them together in substantial parallelism. The size of the core will depend upon the size of the packing desired. A sufficient number of strands of rubber composition should be intermixed with the fibrous strands to insure a united core when vulcanized. After the core is formed it is wound transversely, preferably in one layer although others may be added if desired, with alternate strands of fibrous material 1, and rubber composition 2 and outside of this layer is wound also transversely strands made up of fibrous material 3, enveloped in soft anti-friction metal 4. These latter strands are made by running off suitable metal in ribbon form V-shaped in cross-section, placing a fibrous strand in the groove of the metal ribbon and then twisting the same. Upon completion of the packing as above described, it is then pressed and vulcanized in any suitable manner. The heat of vulcanization in the first place causes the rubber composition to become soft and the pressure forces it to spread between the fibrous strands and when the process of vulcanization is complete, all the strands both in the core and the outer body are bound or cemented firmly together by the cured rubber composition and the packing is a flexible homogeneous body.

It will be noted that the drawings show the packing before it is pressed and vulcanized and, consequently, the rubber strands are shown in their entirety before they are softened and caused to spread between the strands of fibrous material enveloped in metal. After this process is completed the rubber strands are so distributed between the metallic covered strands that they practically disappear as strands.

Although this process of vulcanizing and pressing the packing may be applied to the packing where it is in a continuous rope form, I have found it preferable to cut the packing in short lengths and vulcanize and press it in ring form by suitable molds. At this time the packing may be made of any form in cross-section and of any degree of hardness, thereby enabling the packing to be adapted to an infinity of uses and conditions.

Although I have specified any suitable rubber composition as the desirable cementing substance to bind or cement together the strands of the packing, I do not desire to limit myself to rubber composition alone, as there may be other substances capable of such use. Rubber composition, however, is preferable because it increases the flexibility and compressibility of the packing and thereby contributes to its efficiency.

It will be noticed that this packing is simple in construction and easily and cheaply made and has the great advantage of being susceptible to slight changes in the process of manufacture to adapt it to various conditions of use. At the same time it presents a metallic outer surface to the moving parts and therefore has the advantages of a metallic packing combined with the flexibility and compressibility of soft fibrous packing.

What is claimed is:—

1. A packing comprising a central body or core of any suitable material and an outer body made up of transversely wound strands cemented together by a rubber composition vulcanized under pressure.

2. In a packing, the combination of a central body or core composed of strands laid in substantial parallelism and an outer body made up of strands wound transversely around said core; all of said strands both in the core and the outer body being cemented together with a rubber composition vulcanized under pressure.

3. In a packing, the combination of a core or central body of strands laid in substantial parallelism and an outer body of strands wound transversely around said core; each of said strands both in the core and the outer body being composed of fibrous material enveloped in metal, and all of said strands being cemented together with a rubber composition vulcanized under pressure.

4. The herein described method of making packing consisting in forming a core of a plurality of strands of any suitable material interspersed with strands of rubber composition, winding about said core alternate strands of any suitable material and rubber composition in one or more layers, then vulcanizing said rubber composition under pressure to cement all the strands both in the core and the outer body into a flexible homogeneous mass.

5. The herein described method of making packing consisting in forming the packing from a plurality of strands of suitable material interspersed with strands of rubber composition and then vulcanizing the rubber composition under pressure to cement all the strands of the packing together into a flexible homogeneous mass.

In testimony whereof, I hereunto set my hand, in the presence of two subscribing witnesses, this the seventh day of July, 1909.

ALBERT L. COLE.

Witnesses:
F. J. V. DAKIN,
MABELLE MAC SPARRON.